Sept. 9, 1924.  
A. T. FULLER  
STRAW FEEDING DEVICE FOR THRASHING MACHINES  
Filed Sept. 15, 1923  
1,507,730
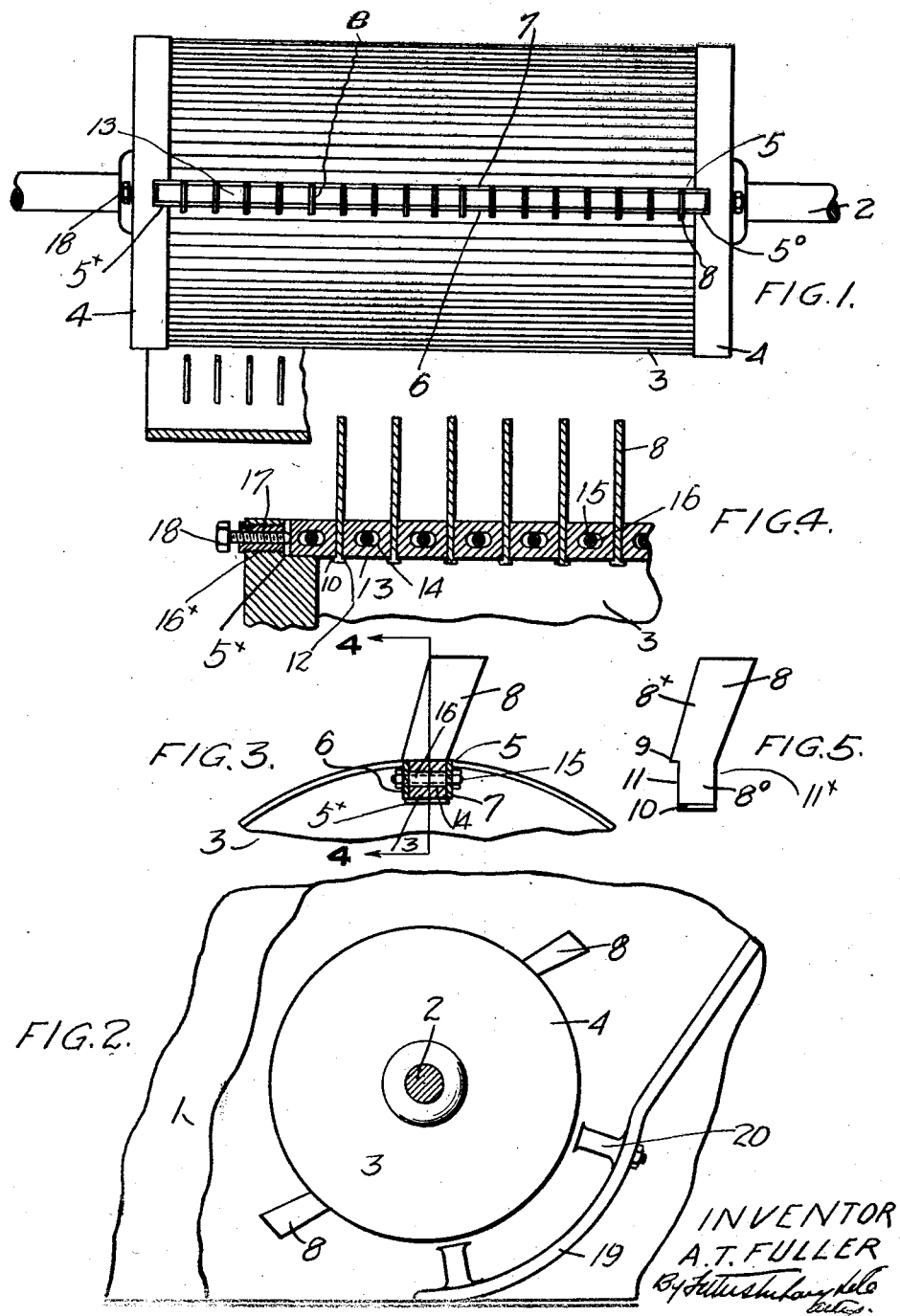

Patented Sept. 9, 1924.

1,507,730

UNITED STATES PATENT OFFICE.

ARCHIE THOMAS FULLER, OF BRAMPTON, ONTARIO, CANADA.

STRAW-FEEDING DEVICE FOR THRASHING MACHINES.

Application filed September 15, 1923. Serial No. 662,872.

*To all whom it may concern:*

Be it known that I, ARCHIE THOMAS FULLER, a subject of the King of Great Britain, and a resident of the town of Brampton, in the county of Peel, in the Province of Ontario, Canada, have invented certain new and useful Improvements in Straw-Feeding Devices for Thrashing Machines, of which the following is the specification.

My invention relates to improvements in straw feeding devices for thrashing machines, and the object of my invention is to devise a device for preventing tangled straw entering the blower pipe of a thrashing machine and choking the same.

My invention consists of a cylinder provided with two series of knives mounted thereon and a stationary concave, and knives carried thereby to coact with the cylinder knives to produce a shearing cut upon the tangled straw.

The invention is illustrated in a simple way in the accompanying drawing in which:

Fig. 1 is a rear elevation showing the machine cylinder and a fragmentary portion of a concave coacting therewith.

Fig. 2 is an end elevation of the cylinder shown in Fig. 1, showing the enclosing casing broken away and the concave in section.

Fig. 3 is an enlarged detail view of a portion of the cylinder showing one of the cutting teeth and the supporting bar in section.

Fig. 4 is a sectional view on the line 4—4 Fig. 3.

Fig. 5 is an enlarged detail of the cutting blade.

In the drawing like characters of reference indicate corresponding parts in the different views.

1 is a casing forming the discharge end of a thresher. 2 is a shaft rotatably mounted therein and 3 is a cylinder mounted on the shaft 2 and formed with cylinder heads 4. 5 are slotted openings formed in the periphery of the cylinder and extending between the heads. As indicated in Fig. 1 the slotted opening is extended into the heads by notches $5^x$ and $5^o$. 6 and 7 are bars extending between the cylinder heads at each side of each slotted opening 5. 8 are a series of knives which are secured in each of the slotted openings between the bars 6 and 7 by the means which I will now describe.

The knives 8 are formed with a shank portion $8^o$, and blade portion $8^x$ extending from the shank at an angle thereto. It will be noted that the shank $8^o$ is slightly narrower than the blade $8^x$ so as to form a shoulder 9. At the base or root of the blade is a projection 10 extending from the lower end of the shank $8^o$ thereby forming an engaging shoulder against which the bar 6 fits. On the opposite edge of the shank $8^o$ is formed a corresponding recessed portion $11^x$, such engaging portion being formed by a projection 12 and the forwardly inclined portion of the blade $8^o$. The bar 7 fits into the recess $11^x$. 13 are spacing blocks which fit between the bars 6 and 7 and between each pair of blades 8. Each spacing block 13 is provided with a longitudinal slot 14. 15 are bolts extending through the bars 6 and 7 and slots 14 of the blocks 13. 16 are spacing sleeves carried by the bolts 15 between the bars 6 and 7. By this means it will be seen that the knives 8 are spaced a definite distance apart.

In each end wall of each slotted opening 5 is formed an orifice $16^x$ in which is inserted a bushing sleeve 17. 18 is a set screw which extends through an orifice $17^x$ formed in each bushing sleeve. The set screw 18, it will be seen, bears against the endmost spacing block 13 of each series of blocks and therefore when the set screws are adjusted or screwed inward they force the blocks endwise inwardly towards the centre of the cylinder and against the shanks $8^o$ of the knives 8 so as to clamp such shanks therebetween. In order to remove the knives for sharpening or renewal, the set screws 18 are loosened so that the blocks 18 may be spread longitudinally apart thereby freeing the knives so that they may be withdrawn from between the bars 6 and 7.

19 is a concave provided with stationary knives 20 coacting with the knives 8 to produce a shearing cut. As the straw passes to the blower pipe it is carried between the concave 19 and cylinder 3 and if such straw is tangled or set in a position crosswise of the machine, such straw is cut up into small portions which will not tangle and therefore have a tendency to clog the blower pipe as they are forced thereinto by the force fan of the machine.

If it is desired to only disentangle the straw without cutting it, the direction of the rotation of the cylinder is reversed so that the backs of the blades 8 which are blunt engage the tangled straw so as to open up the tangled portions and draw them apart so that the straw is passed on to the blower with a longitudinal set instead of a crosswise set, thereby enabling it to pass freely through the blower pipe. When the sharpened edge of the blade is used and the straw cut up as previously described, the straw may be used as ensilage thereby saving the further operation of cutting the straw after it has left the thrashing machine.

From this description it will be seen that I have devised a very simple device whereby the choking of a blower pipe of a thrashing machine is prevented and also such a device from which the cutting knives of the cylinder may be easily and quickly removed for renewal or repair.

What I claim as my invention is:—

1. In a device of the class described, a cylinder having a longitudinal slot therein, blades having shanks engaging the sides of the slot and reduced to form an edge shoulder at the point of junction between the blade and the shank, a rib extending from each side of the shank at its lower edge and extending normally crosswise of the slot, spacing blocks inserted in the slot between each pair of shanks and resting upon each pair of opposing ribs, and means extending crosswise of the slot for holding each block in position.

2. In a device of the class described, a cylinder comprising opposing cylinder heads having opposing edge recesses, bars secured at their ends in the recesses at each side thereof so as to be spaced apart, blades provided with shanks extending between the bars and forming a shoulder resting upon one of said bars, spacing blocks inserted between the shanks, and means for holding the spacing blocks in position.

3. In a device of the class described, a cylinder having a longitudinal slot therein, blades having shanks engaging the sides of the slot and reduced to form an edge shoulder at the point of junction between the blade and the shank bearing upon one edge of the slot, a rib extending from each side of the shank at its lower edge and extending normally crosswise of the slot, spacing blocks held within the slot between each pair of blades so that such ribs underlie the opposite edges of the blocks, and means for securing the blocks within the slot in their intermediate position between the blades permitting separation when released to clear the aforesaid ribs and permit the outward movement of the blades through the space formed by the separation of the blocks.

4. In a device of the class described, a cylinder having a longitudinal slot therein, blades having shanks engaging the sides of the slots, spacing blocks each having a longitudinal slot, bolts extending through the slots of the spacing blocks and the side walls of the cylinder slot, spacing sleeves mounted on the bolts and adjustable means bearing against each endmost block for forcing the blocks and blades inward towards the centre of the slot and holding them in such position.

ARCHIE THOMAS FULLER.